(12) United States Patent
Bugaj et al.

(10) Patent No.: US 7,683,904 B2
(45) Date of Patent: Mar. 23, 2010

(54) MANUAL COMPONENT ASSET CHANGE ISOLATION METHODS AND APPARATUS

(75) Inventors: Stephan Vladimir Bugaj, San Pablo, CA (US); Brett Levin, San Francisco, CA (US); Zachariah Baum, San Francisco, CA (US)

(73) Assignee: Pixar, Emeryville, CA (US)

( * ) Notice: Subject to any disclaimer, the term of this patent is extended or adjusted under 35 U.S.C. 154(b) by 777 days.

(21) Appl. No.: 10/982,190

(22) Filed: Nov. 5, 2004

(65) Prior Publication Data

US 2005/0253848 A1    Nov. 17, 2005

Related U.S. Application Data

(60) Provisional application No. 60/572,277, filed on May 17, 2004.

(51) Int. Cl.
*G06T 13/00* (2006.01)
*G06T 15/00* (2006.01)
*G06F 12/00* (2006.01)
*G06F 17/30* (2006.01)
*G06F 9/44* (2006.01)

(52) U.S. Cl. .................. 345/473; 707/203; 717/170
(58) Field of Classification Search .......... 345/473; 707/203; 717/170
See application file for complete search history.

(56) References Cited

U.S. PATENT DOCUMENTS

| | | | |
|---|---|---|---|
| 4,809,170 A * | 2/1989 | Leblang et al. | 717/122 |
| 5,504,879 A * | 4/1996 | Eisenberg et al. | 707/100 |
| 5,649,200 A * | 7/1997 | Leblang et al. | 717/122 |
| 5,706,510 A * | 1/1998 | Burgoon | 707/203 |
| 5,752,244 A | 5/1998 | Rose et al. | |
| 5,764,980 A * | 6/1998 | Davis et al. | 707/104.1 |
| 5,890,166 A * | 3/1999 | Eisenberg et al. | 707/203 |
| 5,974,428 A * | 10/1999 | Gerard et al. | 707/203 |
| 6,058,397 A | 5/2000 | Barrus et al. | |
| 6,112,024 A * | 8/2000 | Almond et al. | 717/122 |
| 6,119,130 A * | 9/2000 | Nguyen et al. | 707/203 |
| 6,181,336 B1 * | 1/2001 | Chiu et al. | 715/736 |
| 6,243,706 B1 * | 6/2001 | Moreau et al. | 707/101 |
| 6,278,466 B1 | 8/2001 | Chen | |
| 6,313,837 B1 | 11/2001 | Assa et al. | |
| 6,348,921 B1 | 2/2002 | Zhao et al. | |
| 6,353,437 B1 | 3/2002 | Gagne | |
| 6,400,372 B1 | 6/2002 | Gossweiler, III et al. | |
| 6,411,990 B1 * | 6/2002 | Shaffer et al. | 709/206 |

(Continued)

*Primary Examiner*—Ulka Chauhan
*Assistant Examiner*—Crystal Murdoch
(74) *Attorney, Agent, or Firm*—Townsend and Townsend and Crew LLP

(57) ABSTRACT

A method for a computer system includes receiving and storing a first model of an animation asset in a first version location of the animation asset, providing a link between a named version of the animation asset to the first version location of the animation asset, wherein a name of the named version is specified by a first user, thereafter receiving and storing a second model of the animation asset in a second version location of the animation asset, providing the first model of the animation asset from the first version location of the animation asset in response to a specification of the named version of the animation asset by a second user, and providing the second model of the animation asset from the second version location of the animation asset in response to a specification of the animation asset by the second user.

13 Claims, 9 Drawing Sheets

U.S. PATENT DOCUMENTS

| | | | |
|---|---|---|---|
| 6,557,012 B1 * | 4/2003 | Arun et al. | 707/203 |
| 6,559,845 B1 | 5/2003 | Harvill et al. | |
| 6,573,898 B1 | 6/2003 | Mathur et al. | |
| 6,615,204 B1 * | 9/2003 | Menon | 707/3 |
| 7,123,814 B2 * | 10/2006 | David | 386/52 |
| 7,123,816 B2 * | 10/2006 | McGrath et al. | 386/95 |
| 7,127,501 B1 * | 10/2006 | Beir et al. | 709/219 |
| 2002/0091868 A1 * | 7/2002 | Molnar | 709/310 |
| 2002/0156984 A1 * | 10/2002 | Padovano | 711/148 |
| 2004/0012641 A1 * | 1/2004 | Gauthier | 345/848 |
| 2004/0128556 A1 * | 7/2004 | Burnett | 713/201 |
| 2005/0005242 A1 * | 1/2005 | Hoyle | 715/745 |
| 2005/0091603 A1 * | 4/2005 | Chen et al. | 715/769 |
| 2005/0134591 A1 | 6/2005 | Baxter | |
| 2005/0256881 A1 * | 11/2005 | Harrison et al. | 707/10 |
| 2006/0259386 A1 * | 11/2006 | Knowlton et al. | 705/35 |

* cited by examiner

MANUAL COMPONENT ASSET CHANGE ISOLATION METHODS AND APPARATUS

CROSS-REFERENCES TO RELATED APPLICATIONS

The present application incorporates by reference for all purposes and claims priority to Provisional Application No. 60/572,277, filed May 17, 2004. The present application also incorporates by reference for all purposes patent application Ser. No. 10/810,487, filed Mar. 26, 2004.

BACKGROUND OF THE INVENTION

The present invention relates to asset management systems. More particularly, the present invention relates to methods and apparatus for locking and unlocking multiple instances of animation assets by version or by label during rendering.

Throughout the years, movie makers have often tried to tell stories involving make-believe creatures, far away places, and fantastic things. To do so, they have often relied on animation techniques to bring the make-believe to "life." Two of the major paths in animation have traditionally included, drawing-based animation techniques and stop motion animation techniques.

Drawing-based animation techniques were refined in the twentieth century, by movie makers such as Walt Disney and used in movies such as "Snow White and the Seven Dwarfs" (1937) and "Fantasia" (1940). This animation technique typically required artists to hand-draw (or paint) animated images onto a transparent media or cels. After painting, each cel would then be captured or recorded onto film as one or more frames in a movie.

Stop motion-based animation techniques typically required the construction of miniature sets, props, and characters. The filmmakers would construct the sets, add props, and position the miniature characters in a pose. After the animator was happy with how everything was arranged, one or more frames of film would be taken of that specific arrangement. Stop motion animation techniques were developed by movie makers such as Willis O'Brien for movies such as "King Kong" (1933). Subsequently, these techniques were refined by animators such as Ray Harryhausen for movies including "Mighty Joe Young" (1948) and Clash Of The Titans (1981).

With the wide-spread availability of computers in the later part of the twentieth century, animators began to rely upon computers to assist in the animation process. This included using computers to facilitate drawing-based animation, for example, by painting images, by generating in-between images ("tweening"), and the like. This also included using computers to augment stop motion animation techniques. For example, physical models could be represented by virtual models in computer memory, and manipulated.

One of the pioneering companies in the computer-generated animation (CG animation) industry was Pixar. Pixar is more widely known as Pixar Animation Studios, the creators of animated features such as "Toy Story" (1995) and "Toy Story 2" (1999), "A Bugs Life" (1998), "Monsters, Inc." (2001), "Finding Nemo" (2003), "The Incredibles" (2004), and others. In addition to creating animated features, Pixar developed computing platforms specially designed for CG animation, and CG animation software now known as RenderMan®. RenderMan® was particularly well received in the animation industry and recognized with two Academy Awards®. RenderMan® renders images based upon conceptual "software assets" including geometric scene descriptors including references to object models.

Typically, scenes to be rendered are specified (assembled) by one or more users (e.g. animators, lighters, etc.). These scenes include descriptions of the objects, camera angles, lighting sources, and the like. The scene data file (also known as a scene descriptor file) that describes the entire scene is typically very large, on the order of gigabytes. Because the sizes of typical scene descriptor files are typically large, Pixar developed an internal technique for segmenting a scene descriptor file from one large file into a series of smaller files. As described in the co-pending application described above, Pixar developed and used the concept of "hook set" files and references to "hook files" to describe a scene. Accordingly, a typical scene is actually composed of a number of separate data files. Generally, logical assets, such as a scene, a shot (a group of scenes), an object, and the like are themselves composed of any number of separate assets.

The inventors of the present invention have recognized that when rendering a lengthy animated feature, such as a feature film, tens or hundreds of related frames need to be rendered. This process typically takes a substantial period of time, even when parallelized. However, during the time which one frame takes to render, it is possible for different users to install new versions of one or more assets (e.g. objects to be rendered) referenced in the frame. Because frames are not necessarily rendered chronologically, a change to an object, such as a new version of an object, may result in a visual discontinuity, or a "pop" if the new object looks different from the old one in the various scenes. Alternatively, the inclusion of a new version of an object may cause the rendering engine to terminate early with an error.

The inventors of the present invention have recognized that it is not typically feasible to prevent users from modifying a logical asset (e.g. a sequence, a shot, an object) throughout the rendering process. This is because, scenes or shots of animation are finalized at different times, and it would be very inefficient to begin rendering scenes or shots only when all of the scenes or shots have been finished. Accordingly, the inventors have recognized that methods for providing support for multiple simultaneous version of animation assets.

The inventors of the present invention have also recognized that after a shot or sequence has been rendered and that render approved, it is very common for images to need to be re-worked after being approved to make them ready for "film-out." However, versions of the assets that were used often no longer exist because they were replaced with "improved" versions of the assets, for example. Accordingly, it is extremely difficult to re-render or replicate previously rendered images. Further, in practice, the Inventors have recognized that logical animation assets (e.g. characters, props, sets, and the like) are used in many different scenes and shots in a feature, and the logical assets are often changed to meet the needs of the specific shots. Accordingly, a "latest" versions of a logical asset may not be the version that is desired. Therefore, the inventors have recognized that methods for identifying and managing different versions of objects that are used for specific scenes or shots are required.

Some techniques that the inventors have considered to address the above problems have included enforcing a strictly linear production pipeline for animation assets. Drawbacks to this technique include that the increased time and cost to develop assets because only one version of an object can exist at a time. Another drawback is that the added delays may force changes to the storyline. In contrast, the inventors believe a parallel development effort would provide for more of an iterative development where some productions pipelines are unaffected by stalls in other production pipelines.

Another technique considered includes making and storing local copies of logical assets before rendering the scene. Drawbacks to this technique include that when there are a large number of assets, and a large number of scenes, storing copies of assets for each scene in local directories requires an wasteful amount of memory. Additionally copies are often poorly tracked and not stored in a centralized location for easy access. Yet another drawback is that such a technique would be very slow and expensive when applied to thousands of CPUs in a large render farm because of the amount of data that would be stored and passed back and forth. Yet another disadvantage is that this technique does not address the replicability problem described above.

Another technique the inventors have considered included preventing users from installing new versions of objects during the rendering process. Disadvantages to this technique include that would cause an expensive and large bottleneck in the production pipeline. For example, because rendering of certain shots or scenes may last for hours and days, this technique would lock out other users from installing versions of objects for their shots or scenes. Other users would have to wait until small windows of opportunity between renderings to install new versions of objects. Yet another drawback includes that it is inefficient to have users who are attempting to install new versions of objects be made aware of all the other users of the same object and their rendering schedules. Still another disadvantage is that this technique does not address the replicability problem described above.

A technique the inventors considered to address the issue of replicability is through the use of timestamps and traditional version control of assets. However, disadvantages to these techniques includes that different rendering processes can be performed at the same time through the use of local copies of the asset during the development process. Because, no versioning control is provided until an asset is checked-in, replicating of scenes before check-in is not supported. Additionally, when such assets are checked-in, different versions of an object from different users may have the same timestamp or have an out-of-order version number (e.g. version 1.2 includes changes in version 1.3, but version 1.3 lacks changes made in version 1.2.) As such, no version control data exists between the different users. Other drawbacks includes that traditional version control techniques do not support the animation production process because of different assumptions about build stability and uniformity, branching and branching support, mechanisms for deployment, and the like. Yet another drawback to this approach includes that, rolling back of changes to objects is slow, and computationally expensive (i.e. burdens the CPU).

Still another technique considered by the inventors has been through the use of variants. Drawbacks to this technique includes that variants of models as versions of models pollutes the semantics of version control. The inventors consider true variants or branches as an asset based-on another asset, but with a different pipeline purpose or pipeline approach. In contrast, a version is an instance of an asset which is part of a linear progression typically used for development of a variant. Accordingly, this approach also had disadvantages.

Accordingly what is desired is an improved method and apparatus for asset management, without the drawbacks described above.

SUMMARY OF THE INVENTION

The present invention relates to asset management systems. More particularly, the present invention relates to methods and apparatus for locking and unlocking multiple instances of animation assets by version or by label during rendering.

Embodiments of the present invention reduce visual inconsistencies in a scene and provide replicability of rendered scenes. One innovation includes the use of symbolic references to allow the pre-render phase to copy path references to global, static versions of an asset rather than make local copies. Another innovation is that these techniques may be combined with virtually any traditional version control system or change isolation system. Yet another innovation is that the pinning mechanisms can be used both in an interactive session or in a rendering session.

Using embodiments of the present invention, the inventors have discovered that it is not necessary to prevent users from installing new assets or changes to assets during rendering of the asset. Further, by keeping copies of the assets in a logically central location, the replicability problem described is addressed. Additionally, it is believed that less disk space is required on the individual rendering machines because local copies are not needed.

Additionally, embodiments of the present invention allow new versions of assets to be installed without forcing other user references to the asset to be updated. Further, users can easily select whether assets are automatically referenced to the latest version; whether assets are locked or pinned to specific versions in their workspace, Global Model, Shot, sequence, or the like; or whether only certain versions of assets are updated.

According to one aspect of the invention, a method for a computer system is disclosed. One technique includes receiving a first model of an animation asset, storing the first model of the animation asset in a location associated with a first version of the animation asset, and providing a symbolic link between a named version of the animation asset to the location associated with the first version of the animation asset, wherein a name of the named version is specified by a first user. An additional technique may include receiving a second model of the animation asset, and storing the second model of the animation asset in a location associated with a second version of the animation asset. A process includes providing the first model of the animation asset from the location associated with the first version of the animation asset in response to a specification of the named version of the animation asset by a second user, and providing the second model of the animation asset from the location associated with the second version of the animation asset in response to a specification of a default version of the animation asset by the second user.

According to another aspect of the invention, a computer program product for a computer system display is disclosed. One product includes code that directs the processor to receive a first model of an animation asset, code that directs the processor to store the first model of the animation asset in a location associated with a first version of the animation asset, and code that directs the processor to specify a symbolic link between a named version of the animation asset to the location associated with the first version of the animation asset, wherein a name of the named version is specified by a first user. The tangible media may also include code that directs the processor to receive a second model of the animation asset, code that directs the processor to store the second model of the animation asset in a location associated with a second version of the animation asset, and code that directs the processor to specify a symbolic link between a default version of the animation asset to the location associated with the second version of the animation asset. In various embodiments, the first model of the animation asset is accessed in response to a specification of the named version of the animation asset, and the second model of the animation asset is accessed in response to a specification of the default version of the animation asset. In various embodiments, the codes reside on a tangible media such as an optical media, magnetic media, semiconductor media, or the like.

According to one aspect of the invention, another method is described for a computer system. Various techniques include receiving a selection of animation assets from a plurality of animation assets specified in a scene from a user, and determining respective static references associated with each animation asset from the selection of animation assets. An additional technique may include determining a plurality of symbolic links associated with the selection of animation assets in response to the respective static references, and storing the symbolic links associated with the selection of animation assets in a file. In various embodiments, the file is associated with the scene.

BRIEF DESCRIPTION OF THE DRAWINGS

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings in which.

DETAILED DESCRIPTION OF THE INVENTION

Figure 1:
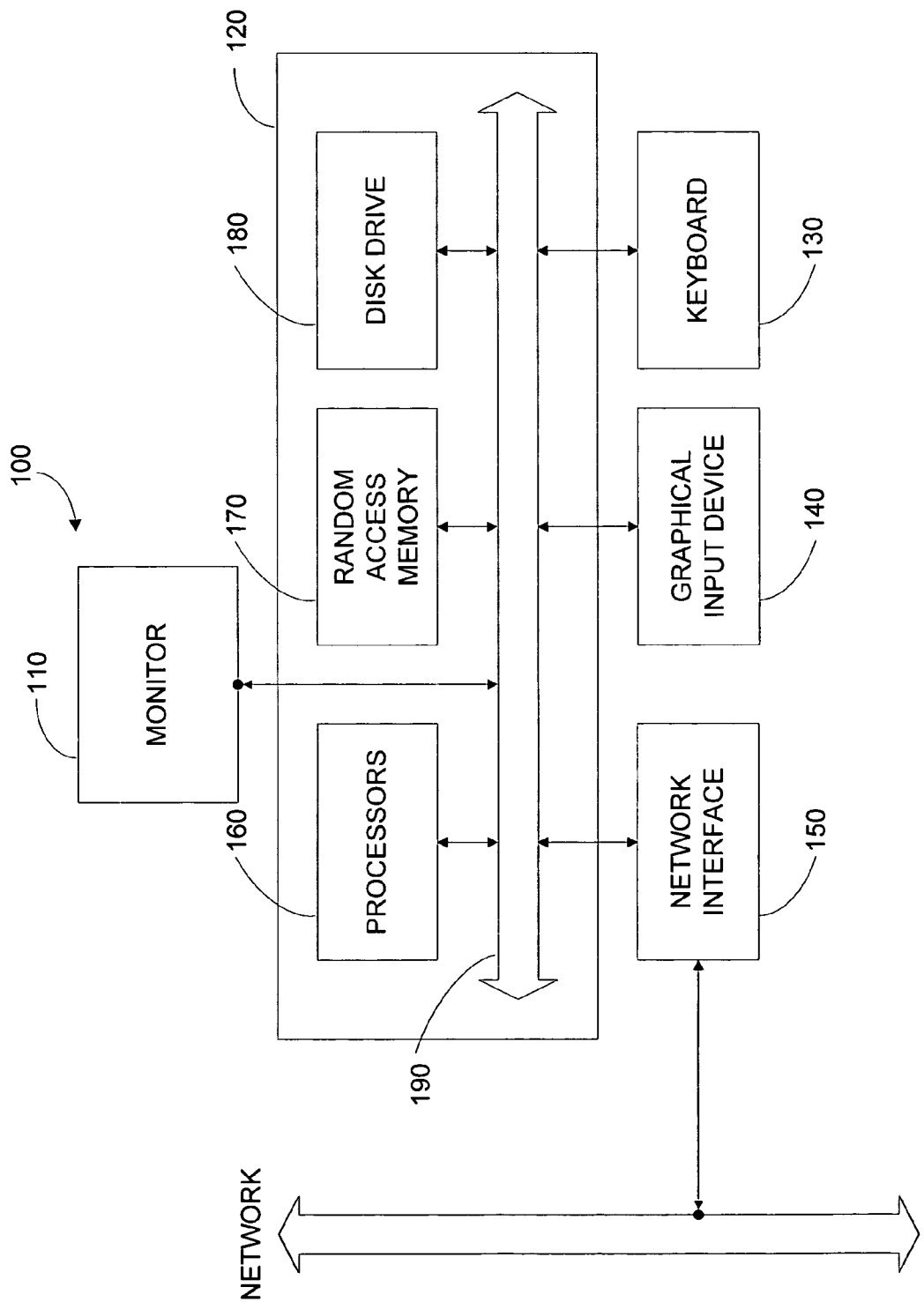
FIG. 1 illustrates a block diagram of a computer system according to one embodiment of the present invention.

FIG. 1 is a block diagram of typical computer system 100 according to an embodiment of the present invention.

In the present embodiment, computer system 100 typically includes a monitor 110, computer 120, a keyboard 130, a user input device 140, a network interface 150, and the like.

In the present embodiment, user input device 140 is typically embodied as a computer mouse, a trackball, a track pad, wireless remote, and the like. User input device 140 typically allows a user to select objects, icons, text, control points and the like that appear on the monitor 110. In some embodiments, monitor 110 and user input device 140 may be integrated, such as with a touch screen display or pen based display such as a Cintiq marketed by Wacom.

Embodiments of network interface 150 typically include an Ethernet card, a modem (telephone, satellite, cable, ISDN), (asynchronous) digital subscriber line (DSL) unit, and the like. Network interface 150 are typically coupled to a computer network as shown. In other embodiments, network interface 150 may be physically integrated on the motherboard of computer 120, may be a software program, such as soft DSL, or the like.

Computer 120 typically includes familiar computer components such as a processor 160, and memory storage devices, such as a random access memory (RAM) 170, disk drives 180, and system bus 190 interconnecting the above components.

In one embodiment, computer 120 is a PC compatible computer having multiple microprocessors such as Xeon™ microprocessor from Intel Corporation. Further, in the present embodiment, computer 120 typically includes a UNIX-based operating system.

RAM 170 and disk drive 180 are examples of tangible media for storage of animation asset data, audio/video files, computer programs, operating system, embodiments of the present invention including an asset management system, a database, logical and aggregate animation assets, object data files, a dependency analyzer, dependency graphs, a rendering engine, operating system, and the like. Other types of tangible media include floppy disks, removable hard disks, optical storage media such as CD-ROMS, semiconductor memories such as flash memories, read-only-memories (ROMS), battery-backed volatile memories, networked storage devices, and the like.

In the present embodiment, computer system 100 may also include software that enables communications over a network such as the HTTP, TCP/IP, RTP/RTSP protocols, and the like. In alternative embodiments of the present invention, other communications software and transfer protocols may also be used, for example IPX, UDP or the like.

FIG. 1 is representative of computer systems capable of embodying the present invention. It will be readily apparent to one of ordinary skill in the art that many other hardware and software configurations are suitable for use with the present invention. For example, the use of other microprocessors are contemplated, such as Pentium™ or Itanium™ microprocessors; Opteron™ or AthlonXP™ microprocessors from Advanced Micro Devices, Inc; PowerPC G4™, G5™ microprocessors from Motorola, Inc.; and the like. Further, other types of operating systems are contemplated, such as Windows® operating system such as WindowsXP®, WindowsNT®, or the like from Microsoft Corporation, Solaris from Sun Microsystems, LINUX, UNIX, MAC OS from Apple Computer Corporation, and the like.

Figure 2:
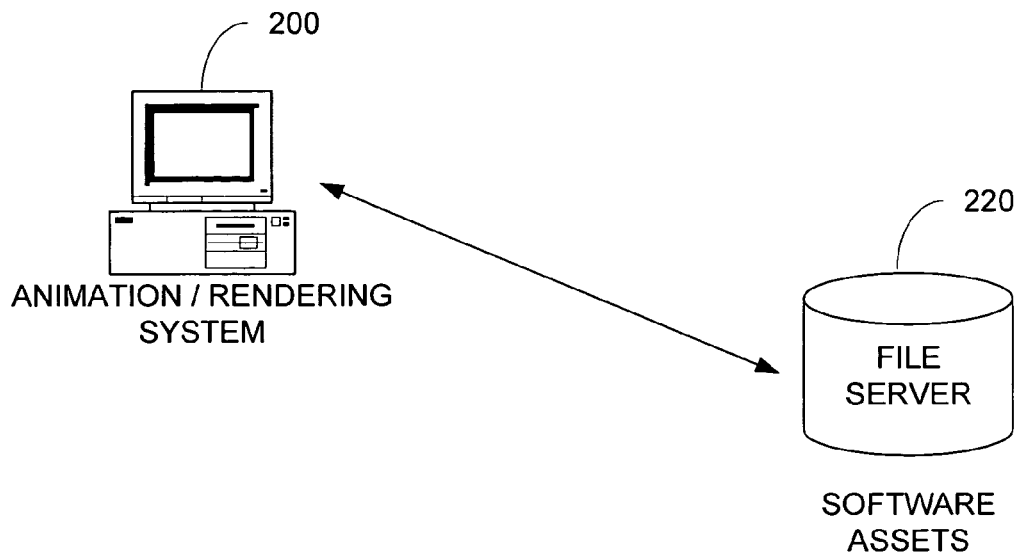
FIG. 2 illustrates a block diagram of an embodiment of the present invention.

FIG. 2 illustrates a block diagram of an embodiment of the present invention. Specifically, FIG. 2 illustrates a computer system 200 and a storage system 210.

In embodiments of the present invention, computer system 200 renders a scene based upon a geometric description of a scene from storage system 220. In embodiments of the present invention, computer system 200 may include one or more computer systems 100. Storage system 220, may include any organized and repeatable way to access the geometric description of a scene including animation assets such as object models, lighting models, camera models, and the like. For example, in one embodiment, storage system 220 includes a simple flat-directory structure on local drive or network drive, or the like. Additionally, locations of object models may be specified by absolute file path locations, relative file paths, specific directories, aliases, UNIX "symlinks" and the like.

In one embodiment of the present invention, a geometric scene descriptor is typically a text file that specifies the animation assets within the scene. Animation assets include lighting objects, camera objects, geometric objects, and the like. These objects are used to specify the scene for rendering purposes. In the present embodiments, the scene descriptor file also specifies the position of objects in the scene, the orientation of objects, the colors and textures for the objects, properties for objects, and the like. In the present invention, the scene descriptor file is a textual file referred to as a "hook set" or "hook file." A scene descriptor file may be associated with only the frame to be rendered, may be associated with a shot of images, may be associated with a portion of a feature, may be associated with the entire feature, or the like. In other embodiments, other types of representation of a scene descriptor can be used with embodiments of the present invention.

An example of the content of a simple hook file may include the following text references to a camera object, a light object, and a (three-dimensional) object:

hook "camera1" {properties of camera 1};
hook "light1" {properties of light 1};
hook "object1" {properties of object 1};

In one embodiment, for a camera object, properties may include: type of projection (e.g. perspective); field of view; width; position; azimuth; pitch, pan, and roll; aspect ratio; focusing option; cropping; shifting; tv aspect ratio, pan and scan option, number of tracks, number of cranes, and the like. An example of a portion of a camera hook is as follows:

```
hook "main_cam" {
    desc = main_ cam: production camera, aka camera01a;
    kind = camera;
    filename = stdobj/Camera01a.m; (filename of camera
    model)...
```

As seen in this example, reference to a file including a specification of a camera model is illustrated as a ".m" file. The .m file is accessed and used when rendering the scene using the camera object. In embodiments of the present invention, other file types for objects are contemplated, such as model files compatible with other three-dimensional creation and manipulation programs, such Maya, SoftImage, or the like.

In another embodiment, for a light object, properties may include: light quality, light type, light shape, light color, and the like. Not all camera objects or light objects need to support the same properties. For example, an "atmospheric fog light" may have a unique fog properties. An example of a portion of a lighting object hook is as follows:

```
hook "LP_Lspt_onPodium" {
    use "stdlight/glight01a/glight01a.hook";
    kind = light;
    class = _Clsss_Glight01a;
    macro = glight01a(name);
    filename = stdlight/glight01a/glight01a.m; (filename of light
    model)
```

As seen in this example, reference to a file including a specification of a light model is also illustrated as a ".m" file. The .m file is accessed and used when rendering the light object in the scene.

In embodiments of the present invention, geometric objects may include three dimensional descriptions of objects, such as an animated character (e.g. Bob, Marlin, Woody), a prop (e.g. a table, a chair), and the like. Additionally, geometric objects may include virtually any imaginable properties supported. For example, one geometric parameter may be: number of wheels for an automobile object; number of eyeballs for a monster object, or other animation variable, and the like. Additionally, a geometric object may include references to files including physical models. An example of a portion of a geometric object hook is as follows:

```
hook "object1"  {full_model = "object1_full.mdl";number_of_legs =
    4;
    standin_model = "object1_standin.mdl"; number_of_
    legs = 1;
    ...}
```

In this example, a first geometric description file is specified "object1_full.mdl" and a second geometric description file is also specified "object1_standin.mdl." These respective .mdl files are accessed and used when rendering the geometric object in the scene. In the present embodiment, each model descriptor file is an industry standard .mdl file that specifies how object1 is to be rendered in the scene. In other embodiments, the model descriptor files may include procedurally generated geometric components, procedurally generated textures, and the like for object1. In still other embodiments, combinations of both pre-defined and procedurally generated aspects of object1 may be used.

Further, the .mdl files typically store pre-defined geometric components, shaders, textures, colors, or the like. In embodiments of the present invention, assets may themselves be aggregate assets, for example, the geometric components may include references to other geometric components, a referenced shader may be an aggregate of other shaders, and the like.

The techniques described use representations of objects that are found at "hard coded" or relative computer locations, such as at specific computer disk directories, at specific network directories, with specific file names or aliases, or the like. However, in other embodiments, databases and asset management software may be used to provide the object models.

In various embodiments, the user may or may not specify specific versions of the models to use when rendering a scene. In embodiments where a version number is not provided, it is assumed the user desires a default version of an object such as the latest version, or the like. In other embodiments, the user may specify a symbolic reference to the desired model version, such as "beta version," "stable version," "original version," "small version," or the like. In this example, the symbolic reference is associated with a specific directory or location for the "latest" version of a model, for the "stable" version of a model, or the like.

Figure 3:
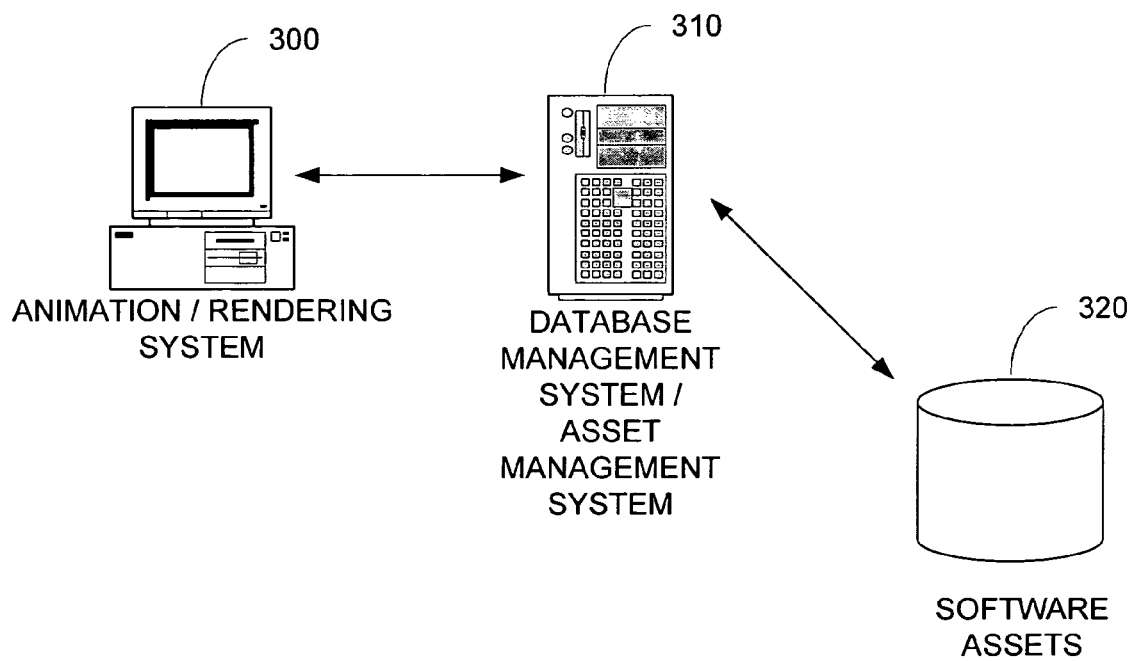
FIG. 3 illustrates another embodiment of the present invention.

FIG. 3 illustrates another embodiment of the present invention. More specifically, FIG. 3 illustrates a computer system coupled to a database.

FIG. 3 includes a computer system 300, a database management system (dbms) 310, and a database 320. In the present embodiment, computer system 300 is a typical rendering system, described above in FIG. 1. Further, database management system 310 and database 320 may be a conventional database systems, available from Oracle, Sybase, or the like.

In the present embodiment, dbms 310 may include conventional database access mechanisms, such as an SQL query tool, or the like. In various embodiment, dbms 310 may include additional front-end software that provides organized access to database 320. In one example, the additional front-end software may include "asset management" software, i.e. software that enables users to more easily store and later retrieve software assets via a structured interface. In embodiments of the present invention, any conventional software asset management system may be adapted to be used.

In operation, computer system 300 may retrieve a scene descriptor file from dbms 310, similar to the above. In this embodiment, the scene descriptor file may simply specify an object name (asset name), specific search terms, a database query, or other terms that are used by dbms 310 to locate a model file. For example, instead of specifying a filename within a directory, as shown above, the scene descriptor file may specify a series of key search terms to dbms 310. In response, in this example, dbms 310 uses the key search terms to query database 320 and return a pointer or a specific directory location where the desired object representation may be found. In other embodiments, the model file may be returned. In an additional embodiment, an asset management system (e.g. a front-end) may be used along with dbms 310. In such examples, the scene descriptor file may provide search terms associated with the desired object. In response, the asset management system would return a pointer to the file, a directory, the model file, or the like.

Similar to the embodiment above, a scene descriptor file (e.g. hook set file) may also specify specific versions of models to use. Examples of versions include: version 1.0, version 2.2, "latest version" "release version," "preproduction version," and the like.

Embodiments of the present invention can be used with both of the above file access methods to automatically pin versions of assets during a scene rendering.

Figure 4A:
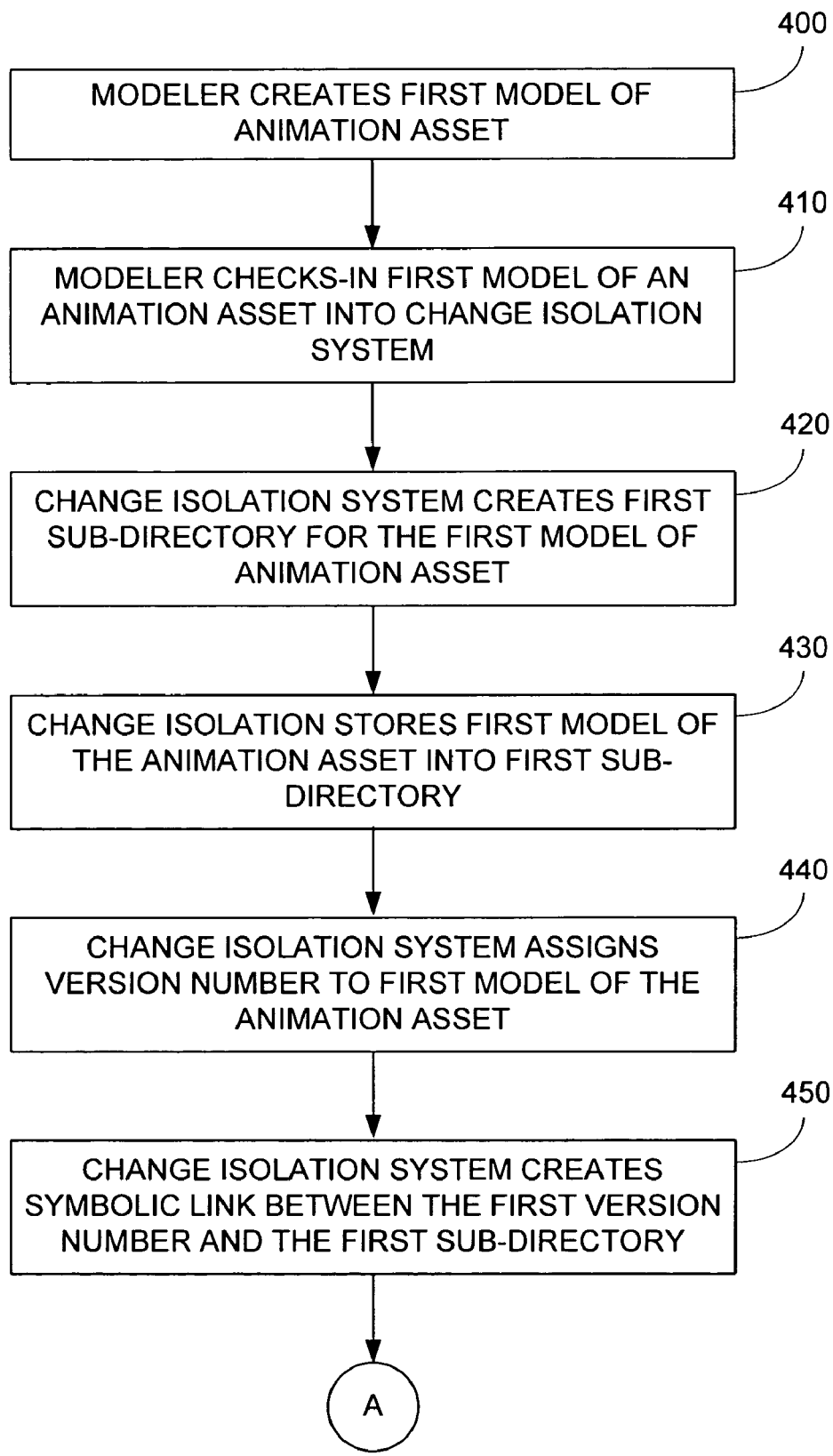
FIGS. 4A-D illustrate a block diagram of a flow process according to an embodiment of the present invention.
Figure 4B:
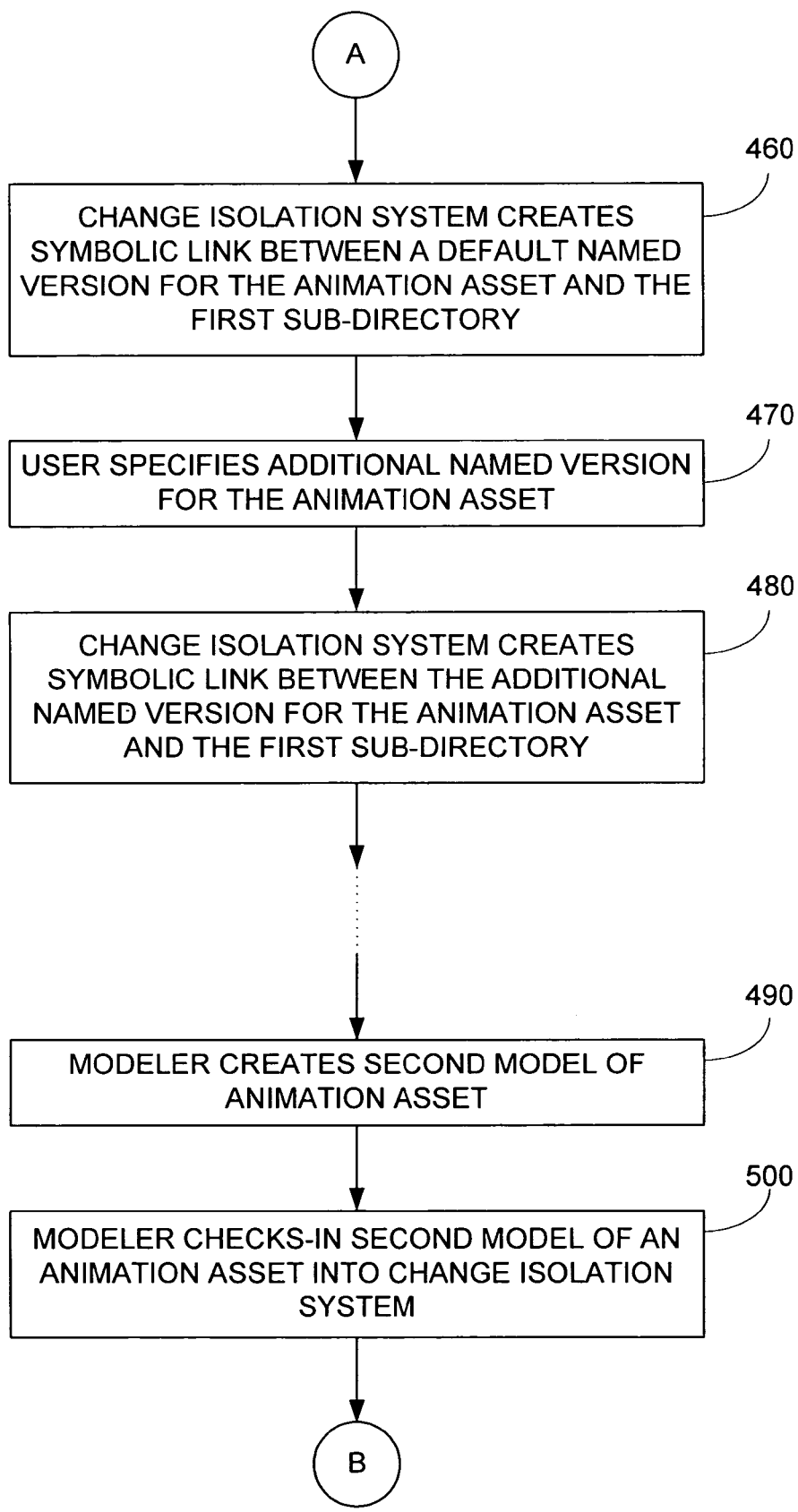
Figure 4C:
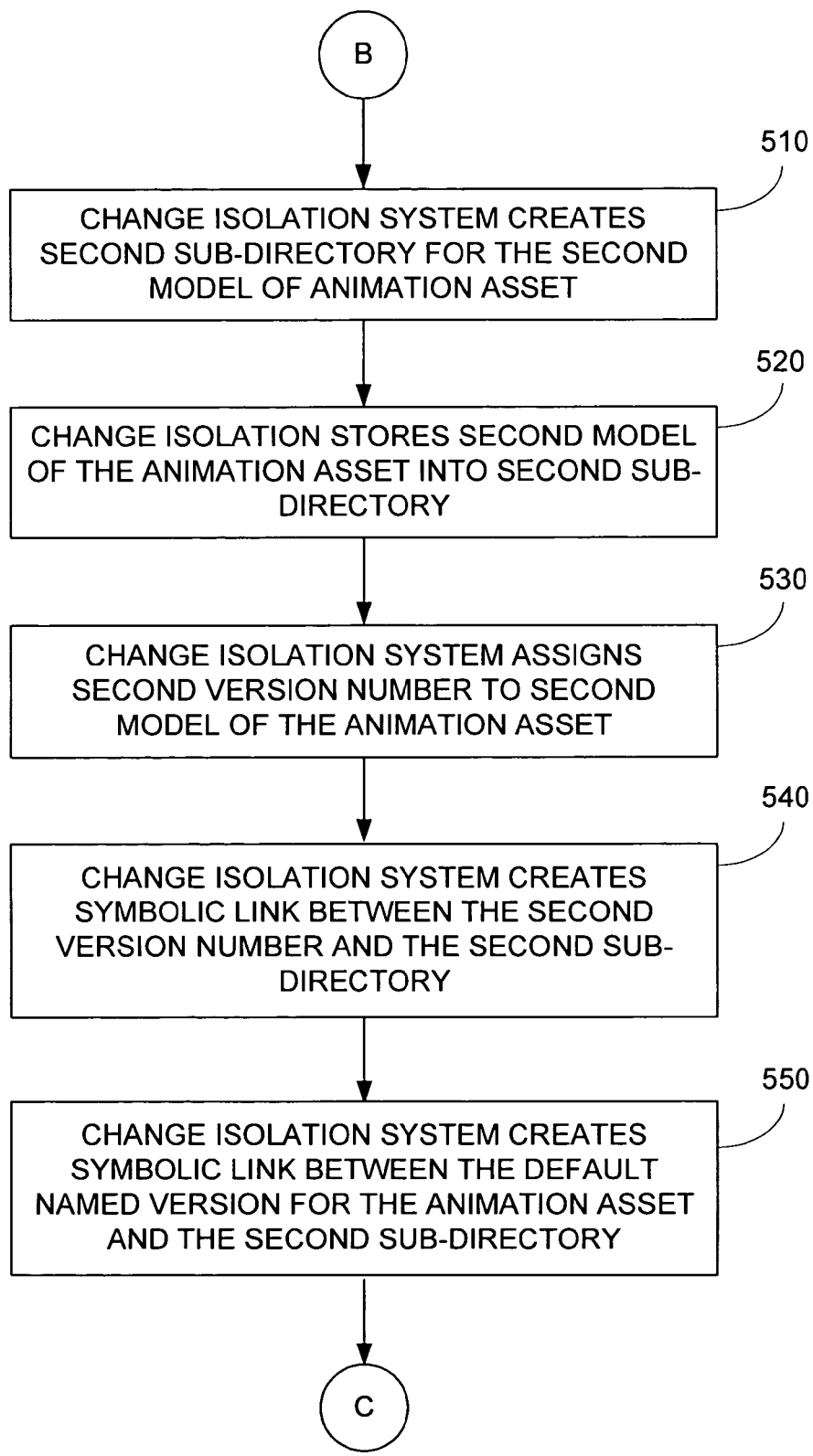
Figure 4D:
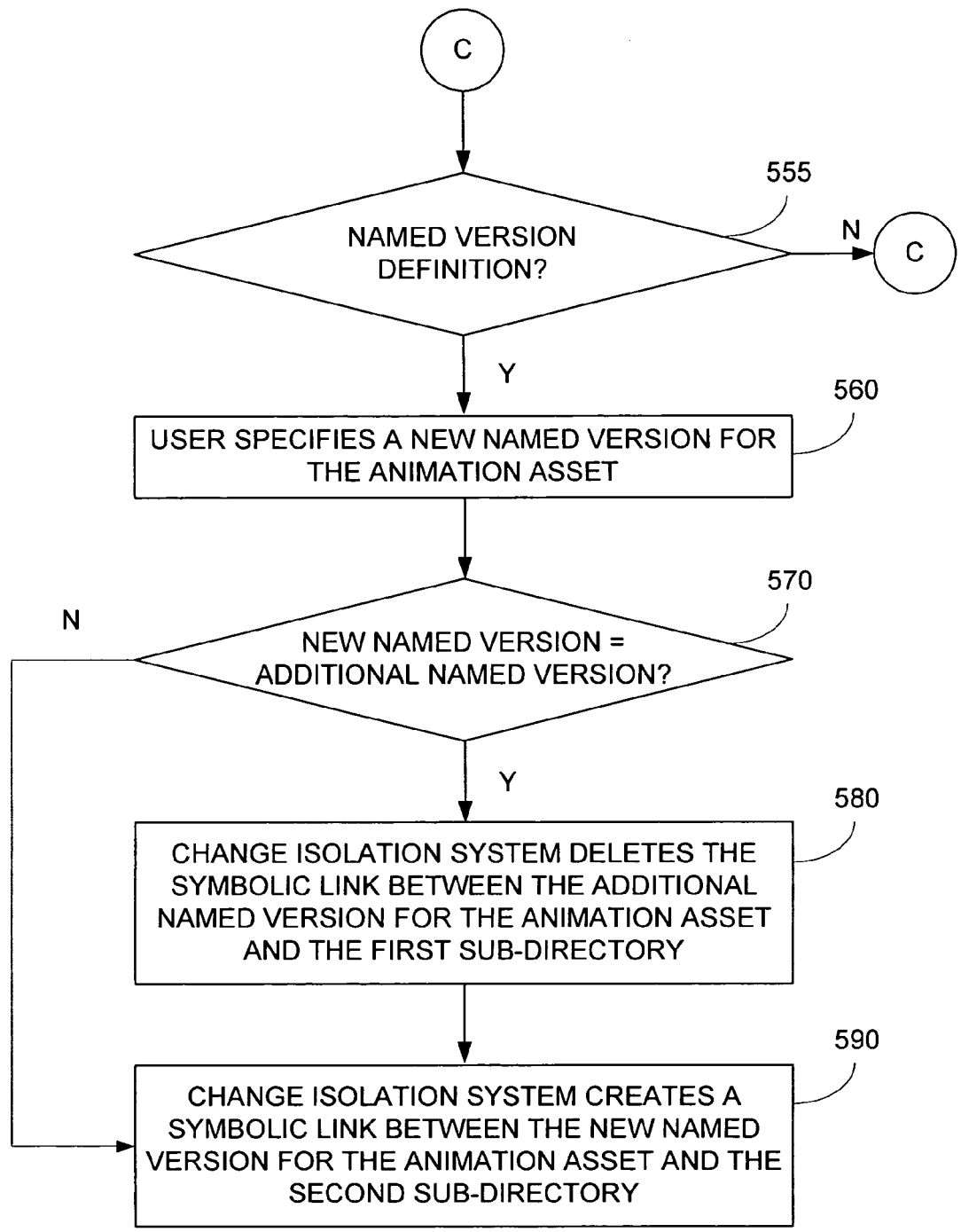

FIGS. 4A-D illustrate a block diagram of a flow process according to an embodiment of the present invention. More specifically, FIGS. 4A-C illustrate a process of entering and labeling animation assets in an asset management system.

Initially a user, such as an modeler, creates a first "model" of an animation asset, step 400. As discussed above, typical types of animation assets includes models of objects, lights, camera, and the like. In the present embodiments, conventional animation tools may be used to create such animation assets.

Next, the user enters the first model of the animation asset into an asset management system, step 410. In the present embodiments, one or more user interfaces may be provided to the user to specify a path where the model of the animation asset resides. For example, the user may place the first model in a specific directory path on the user's computer, or in a network disk location. In various embodiments, the asset management system may also be termed a change isolation system.

In response to the new model, in the present embodiment, the asset management system creates a first subdirectory, for the new model, step 420, and stores the first model in the first subdirectory, step 430. In embodiments of the present invention, each version of a model are stored in a unique subdirectory within the asset management system, however, in other embodiments, the different versions of the models may reside in a common directory, or particular versions of the models may reside in a common directory (e.g. version 2.x in one directory, version 3.x in another directory). In some embodiments, as will be described below, the sub-directories can be directly accessed. In other embodiments, the asset management system may serve as a gateway for requests, accordingly, the location where the new model is stored is kept private.

Additionally, in the various embodiments, the asset management system assigns a first version number for the animation asset, step 440. In embodiments of the present invention, the version number may be any typical alphanumeric designation such as 2.0, 3.1 a, 1.10, and the like.

Next, in the present embodiment, the asset management system creates an operating system symbolic link between the first version number for the animation asset and the subdirectory, step 450. In various embodiments, the symbolic link may be a UNIX symlink, an alias, or the like. By providing the symbolic link at the operating system level, the symbolic link is accessible by users.

Next, in the present embodiment, the asset management system creates an operating system symbolic link between a "named" version of the animation asset and the first subdirectory, step 460. Similar to the above, the symbolic link may be an operating system level link that is accessible by users. In the present embodiments, a default "named" version of the animation asset is contemplated, such as: "latest version," or the like. In the present embodiments, it is contemplated that a request for the "latest" version of an object in the asset management system will return the first model provided from the linked first subdirectory.

Additionally, in various embodiments, the user may provide or select another "named" version label for the animation asset, step 470. Example of named versions includes: "stable version," "latest production version," "prototype version," "lighting version," "Bill's version," "Shader Group version," or the like. In various embodiments, the "named version" label may be entered by the user or selected by the user from pre-defined labels. In response to the request, the asset management system creates an operating system symbolic link between the "named" version label of the animation asset and the first subdirectory, step 480. Similar to the above, the symbolic link may be an operating system level link that is accessible by users. Generally, in embodiments of the present invention, users requesting the named versions of the animation asset will retrieve the specific model provided from the subdirectory that is linked to the label. For example, in the present case, a user requesting a "stable version" of the animation asset will be linked to the first subdirectory.

In other embodiments of the present invention, the association of another "named version" label for the animation asset need not be performed when the model is entered, but at a later time. As an example, versions 1.0, 1.1, 2.0, 3.0, 3.1, and 3.2 for an animation asset may be entered into the asset management system. Later, the user requests creation of a link between a "named version" label and any of the entered versions. For example, the user may select version 1.0 to be linked with a "bald version" label; version 2.0 to be linked with a "hairy version" label; and the like.

Next, in the present embodiment, a different (or the same) user, creates a second model of an animation asset, step 490. For example, the different user may add or remove elements from a model of a physical objects, camera objects, or light objects that already exists. Again, the user may enter the second model of the animation asset into the asset management system, as discussed above, step 500.

Next, in response to the second model of the animation asset, the asset management system creates a second subdirectory, for the second model, step 510, and stores the second model in this second subdirectory, step 520. In the present embodiments, the asset management system also assigns a second version number for the animation asset, step 530. In the various embodiments, moving to a subsequent version may be performed by rolling the alphanumeric version to the next number. For example, 2.0 may roll to 2.1, 3.0, 2.0a; 3.1a may roll to 3.2a, 4.2a, 3.1b, and the like. Many other conventional ways for indicating the change of versions are contemplated in embodiments of the present invention. In various embodiments, the version numbers may refer to chronologically entered versions of a model, or the like. In other embodiments, version numbers may be manually assigned.

Next, in the present embodiment, the asset management system creates an operating system symbolic link between the second version number for the animation asset and the second subdirectory, step 540. Similar to above, the symbolic link may be a UNIX symlink, an alias, or the like at the operating system level, that redirects a request for the animation asset to a specific path or file.

Generally, in one embodiment of the present invention, the asset management system automatically updates the operating system symbolic link between the default "named" version of the animation asset and the second subdirectory, step 550. For example, in the present case, when the second version of the model is entered, the operating system symbolic link between the default named label (e.g. "latest version") and the first subdirectory is deleted and/or written over with a symbolic link between the "latest version" label and the second subdirectory. Because of this, a subsequent request for the "latest" version of an object will now be the provided from the linked second subdirectory. In other embodiments, the user may specify whether the default named label is updated.

In embodiments of the present, it is noted that other symbolic links between other named version labels (e.g. "stable version") of the animation asset and respective sub-directories are not modified with the steps above. Accordingly, in the present case, a request for a "stable version" of the animation asset will still be linked to the first subdirectory.

In various embodiments of the present invention, the user entering the second model may indicate that the second model of the animation asset should be associated with a selected named version label, step 555. In various embodiments, the user may enter or specify the selected named version label by using a conventional user interface for the asset management system, step 560.

In various embodiments, if a symbolic link already exists for the selected named version, step 570, the asset management system deletes the operating system symbolic link between the selected named version label of the animation asset and the first subdirectory, step 580. Next, the asset management system creates the operating system symbolic link between the selected named version label of the animation asset and the second subdirectory, step 590. As an example, when the second version of the model is entered, the user may indicate that the second version is a "stable version" of the animation asset. Then, according to the process above, the asset management system deletes the operating system symbolic link between the "stable version" label and the first subdirectory and creates a symbolic link between the "stable version" label and the second subdirectory. Subsequently, a request for the "stable version" of an object will be the provided from the second subdirectory linked to the "stable version" label.

In various embodiments, by performing step 590, the symbolic link in step 580 is not specifically deleted, but written over in step 590.

In other embodiments of the present invention, the updating of a "named version" label for the animation asset to a different version may be performed at a time different from when the second model is entered.

In light of the above, embodiments of the present invention support different users using different versions of animation assets in an asset management system without conflict. As seen, versions of animation assets can now be referred to by a named version. Further, because named versions may be associated with different versions automatically, users need not manually monitor versions or update their scene descriptors.

Figure 5A:
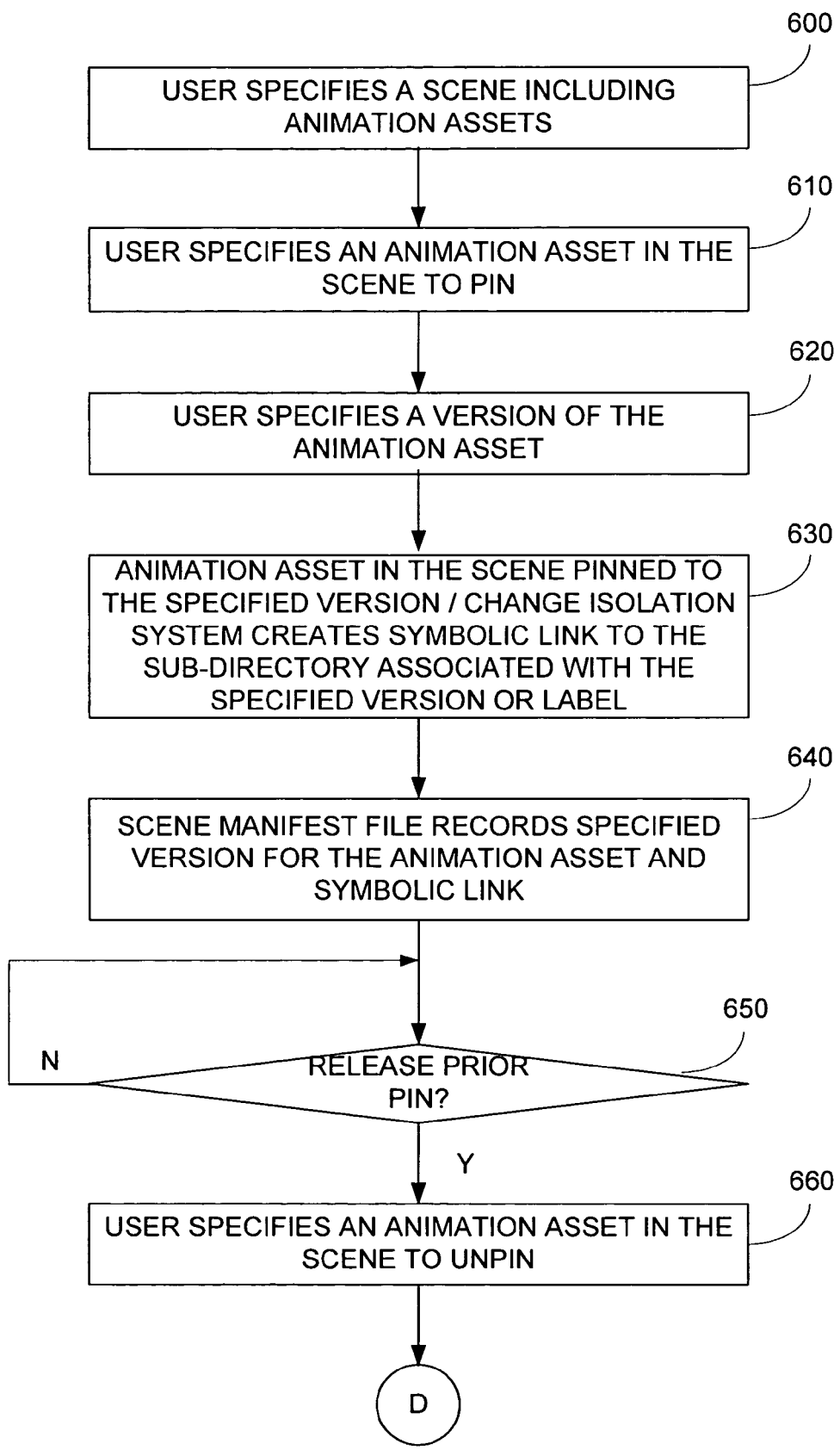
FIGS. 5A-C illustrate a block diagram of a flow process according to an embodiment of the present invention.
Figure 5B:
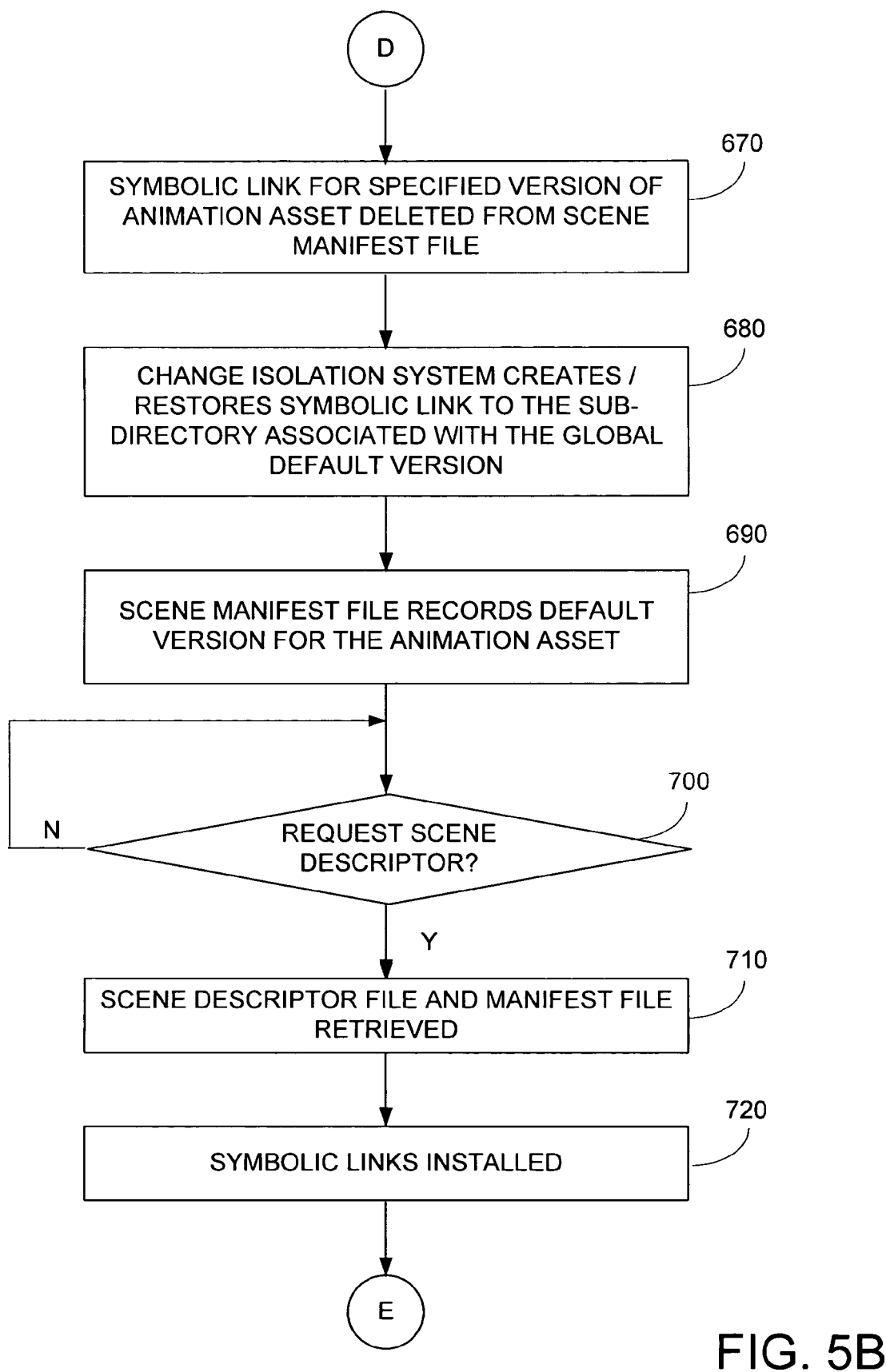
Figure 5C:
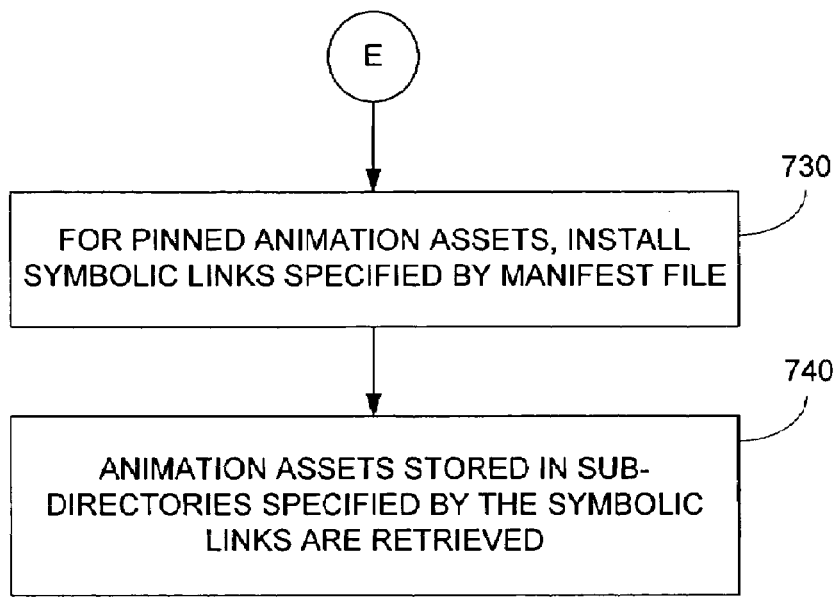

FIGS. 5A-C illustrate a block diagram of a flow process according to an embodiment of the present invention. More specifically, FIGS. 5A-C illustrate a process of animation asset pinning.

Initially a user specifies a scene including animation assets, step 600. In embodiments of the present invention, scenes are typically created by more than one user, for example a set dresser who places object assets (e.g. items) in a scene, an animator who places one or more objects assets (e.g. a character) to animate in a scene, a lighter who places light assets in a scene, and the like.

Next, the user specifies an animation asset to pin in their local path, step 610. In embodiments of the present invention, "pinning" refers to a user selection of a specific version of an animation asset for the scene. In embodiments of the present invention, the user may perform this action via a graphical user interface of the asset management system; the user may perform this action by setting a keyword in the scene descriptor file; or the like. Additionally, the user specifies a version of the animation asset (or a label) to pin, step 620. In embodiments of the present invention, various version identifying schemes may be used, such as "Version 3.2," "hair version," "lighting group version," "beta version."

In response to the selection of the animation asset and to the version, the animation asset is then pinned or locked to the selected version, step 630. Accordingly, the selected version is returned for building the scene, for rendering purposes, and the like. As an example, in a case where versions 1.0, 1.1, 2.0, and 3.0 for an animation asset have been checked-into the asset management system, for a specific scene, the animation asset may be locked to a specific version number, for example version 1.1, or the like. In additional embodiments, the animation assets may be pinned to specific named versions of an animation asset. For example an animation asset may be pinned to the "beta" version of the asset, even if the "beta" version changes, for example, from version 0.4 to 1.3 to 2.4 etc. Thus, as can be seen, pinning to named versions allows redirection to different numeric version numbers without the user manually releasing and updating a pin for an animation asset.

In embodiments of the present invention, a symbolic link is then provided that redirects a local path to the animation asset to the path associated with the pinned version. As an example, an animation asset may be pinned to the "beta" version of the asset, and the "beta" version of the asset is symbolically linked to a subdirectory that stores version 1.0 of the animation asset. Accordingly, the animation asset is effectively linked to the version 1.0 subdirectory, for that scene.

In embodiments of the present invention, the pinning of the animation asset and the pinned version are stored in a manifest file associated with the scene (e.g. scene descriptor file), step 640. In various embodiments, the manifest file is a human readable text file that includes a listing of animation assets that have been pinned, and the pinned versions. In other embodiments, the manifest file is a machine readable file that is accessed by the asset management system.

In embodiments of the present invention, a user may decide to release a previous version pin for an animation asset, step 650. To do this, the user initially specifies the animation asset to be unpinned, step 660. In one embodiment, the user may be presented with a graphical representation of the manifest file, and the user may click upon the animation asset to be unpinned. In other embodiments, the user may submit the animation asset to the asset management system for unpinning.

In response to the request, the asset management system deletes the existing symbolic link, and the like, from the manifest file, step 670, and creates a symbolic link to a new or default version of the animation asset, step 680. As an example, a symbolic link to a subdirectory path including a "beta" version of the animation asset is deleted, and a new symbolic link is generated that refers to a subdirectory path that stores the "latest version" of the animation asset, or the like. In other embodiments, the symbolic link created in step 680 automatically overwrites the existing symbolic link in step 670.

In various embodiments, by performing step 680, the symbolic link in step 570 is not specifically deleted, but written over in step 680. In other embodiments, symbolic links are installed in the working environment, accordingly, when a pin is released, no new symbolic link need be specifically defined. In embodiments of the present invention, the symbolic link may be stored in the manifest file, step 690.

Subsequently, in embodiments of the present invention, the same or different user may request the scene from the asset management system, step 700. In response, a scene descriptor file and an associated manifest file, determined above, are retrieved, step 710. In the present embodiment, symbolic links to animation assets in default global directory paths are automatically created in the user's environment, step 720. Next, referring to the manifest file, symbolic links to animation assets that were pinned to specific versions are installed, step 730. For example, links to specific directory paths, or the like included in the manifest, are specified for the user's environment, when retrieving specific animation assets. In the present embodiments, these symbolic links override the symbolic links previously installed.

Once the symbolic links have been installed, the animation assets in the scene are retrieved from the specified subdirectories, step 740. In embodiments of the present invention, the animation asset may be used by the user for a variety of purposes, including rendering, set-design, lighting, and the like.

Figure 6:
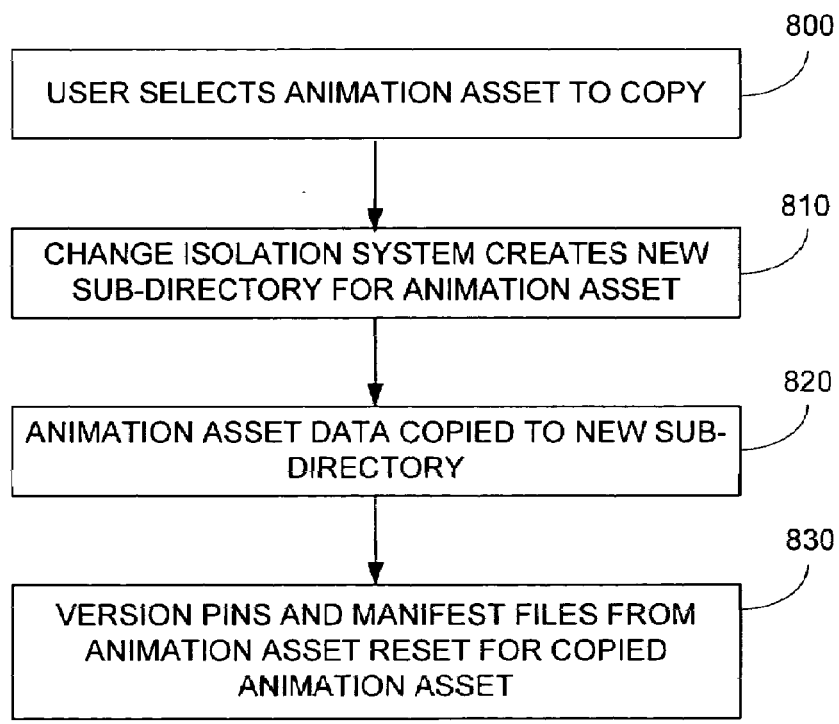
FIG. 6 illustrates a block diagram of a flow process according to an embodiment of the present invention.

FIG. 6 illustrate a block diagram of a flow process according to an embodiment of the present invention. More specifically, FIG. 6 illustrate a process of creating a variant of an animation asset.

In the present embodiment, the user initially provides the asset management system the name of the animation asset to copy, step 800. In response, the asset management system creates a new subdirectory for the new animation asset, step 810, and copies versions of the animation asset to the new subdirectory, step 820. Finally, any change isolation pins or manifest files associated with the animation asset are deleted and/or reset for the new animation asset, step 830.

Many changes or modifications are readily envisioned. In light of the above disclosure, one of ordinary skill in the art would recognize that many variations may be implemented based upon the discussed embodiments. Further, the embodiments discussed above may also be combined.

It should be understood that "rendering" may refer to a high quality process of converting an image from a mathematical description of a scene using a program such as RenderMan®. Additionally, "rendering" may refer to any graphical visualization of the mathematical description of the scene, or any conversion of geometry to pixels, for example "rendering" with a lower quality rendering engine, or the like. Examples of low-quality rendering engines include GL and GPU hardware and software renderers, and the like Further embodiments can be envisioned to one of ordinary skill in the art after reading this disclosure. In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method for a computer system including a processor and a memory comprises:

receiving a first model of an animation asset from a first user; creating a first sub-directory in the memory associated with a first version of the animation asset;

storing the first model of the animation asset in the first sub-directory in the memory;

providing an operating system symbolic link under direction of the processor between a named version of the animation asset to the first sub-directory to the first user, wherein a name of the named version is specified by the first user;

providing an operating system symbolic link under direction of the processor between a default version of the animation asset and the first sub-directory to the first user, thereafter receiving a second model of the animation asset;

creating a second sub-directory in the memory associated with a second version of the animation asset;

storing the second model of the animation asset in the second sub-directory in the memory;

providing a revised operating system symbolic link under direction of the processor between the default version of the animation asset and the second sub-directory to the first user, thereafter providing the first model of the animation asset from the first sub-directory in the memory in response to a specification of the operating system symbolic link of the named version of the animation asset by the first user; and providing the second model of the animation asset from the second sub-directory in the memory in response to a specification of the revised operating system symbolic link of the default version of the animation asset by the first user.

2. The method of claim 1 wherein providing the operating system symbolic link under the direction of the processor between the named version of the animation asset to the first sub-directory comprises providing the operating system symbolic link between the named version of the animation asset and the first sub-directory.

3. The method of claim 1 wherein providing the operating system symbolic link between the named version of the animation asset to the first sub-directory comprises creating an operating system reference under the direction of the processor from the named version of the animation asset to the first model of the animation asset in the first sub-directory.

4. The method of claim 1 further comprising:
providing the revised operating system symbolic link under the direction of the processor between the default version of the animation asset to the second sub-directory to a second user; and
providing the second model of the animation asset from the second sub-directory in response to a specification of the revised operating system symbolic link of the default version of the animation asset by the second user.

5. The method of claim 1 further comprising:
receiving a third model for the animation asset;
storing the third model of the animation asset in a third sub-directory in the memory, wherein the third version is subsequent to the second version;
providing a revised operating system symbolic link under the direction of the processor between the named version of the animation asset to the second sub-directory to the first user;
providing another revised operating system symbolic link under the direction of the processor between the default version of the animation asset and the second sub-directory to the user, thereafter
providing the second model of the animation asset from the second sub-directory in the memory in response to a specification of the revised operating system symbolic link of the named version of the animation asset by the first user; and
providing the third model of the animation asset from the third sub-directory in the memory in response to a specification of the other revised operating system symbolic link the default version of the animation asset by the first user.

6. The method of claim 1 wherein the animation asset is selected from a group consisting of: an model of an object, a model of alight, a model of a camera.

7. A computer program product resident on a tangible media comprising computer-executable code for a computer system including a processor comprises:
code that directs the processor to receive a first model of an animation asset;
code that directs the processor to create a first sub-directory associated with a first version of the animation asset;
code that directs the processor to store the first model of the animation asset in the first sub-directory;
code that directs the processor to specify a operating system symbolic link between a named version of the animation asset to the first sub-directory, wherein a name of the named version is specified by a first user;
code that directs the processor to specify an operating system symbolic link between a default version of the animation asset and the first sub-directory; thereafter
code that directs the processor to receive a second model of the animation asset;
code that directs the processor to create a second sub-directory associated with a second version of the animation asset;
code that directs the processor to store the second model of the animation asset in the second sub-directory;
codes that directs the processor to specify a revised operating system symbolic link between the default version of the animation asset to the second sub-directory;
wherein the first model of the animation asset is accessed from the first sub-directory in response to a specification of the named version of the animation asset;
wherein the second model of the animation asset is accessed from the second sub-directory in response to a specification of the default version of the animation asset.

8. The computer program product of claim 7 wherein code that directs the processor to specify an operating system symbolic link comprises code that directs the processor to define the operating system symbolic link between the named version of the animation asset and the first sub-directory.

9. The computer program product of claim 8 wherein the operating system symbolic link comprises an operating system reference.

10. The computer program product of claim 8 wherein the first model of the animation asset is accessed from the first sub-directory.

11. The computer program product of claim 7 further comprising:
code that directs the processor to specify a operating system symbolic link between the named version of the animation asset to the second sub-directory and;
wherein the second model of the animation asset is accessed from the second sub-directory in response to a specification of the named version of the animation asset.

12. The computer program product of claim 7 further comprising:
code that directs the processor to receive a third model of the animation asset;
code that directs the processor to create a third sub-directory associated with a third version of the animation asset;
code that directs the processor to store the third model of the animation asset in the third sub-directory; and
code that directs the processor to specify a revised operating system symbolic link between the default version of the animation asset to the third sub-directory;
wherein the third model of the animation asset is accessed from the third sub-directory in response to a specification of the default version of the animation asset.

13. The computer program product of claim 7 wherein the animation asset is selected from a group consisting of: an object, a light, a camera.

* * * * *